(12) United States Patent
Funk et al.

(10) Patent No.: US 9,809,154 B2
(45) Date of Patent: Nov. 7, 2017

(54) METHOD FOR OPERATING A HEADLIGHT FOR A MOTOR VEHICLE

(71) Applicant: AUDI AG, Ingolstadt (DE)

(72) Inventors: Christian Funk, Beilngries (DE); Florenz Barmeyer, Ingolstadt (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 15/103,831

(22) PCT Filed: Nov. 7, 2014

(86) PCT No.: PCT/EP2014/002994
§ 371 (c)(1),
(2) Date: Jun. 10, 2016

(87) PCT Pub. No.: WO2015/086104
PCT Pub. Date: Jun. 18, 2015

(65) Prior Publication Data
US 2016/0332559 A1 Nov. 17, 2016

(30) Foreign Application Priority Data
Dec. 11, 2013 (DE) .................. 10 2013 020 754

(51) Int. Cl.
*B60Q 1/14* (2006.01)
*G06K 9/00* (2006.01)
(Continued)

(52) U.S. Cl.
CPC ......... *B60Q 1/143* (2013.01); *G06K 9/00798* (2013.01); *H04N 5/23229* (2013.01);
(Continued)

(58) Field of Classification Search
CPC ............... B60C 1/143; G06K 9/00798; H04N 5/23229; H05B 33/0854
(Continued)

(56) References Cited

U.S. PATENT DOCUMENTS 6,459,387 B1 10/2002 Kobayashi et al.
7,697,027 B2 * 4/2010 McMahon ............ H04N 7/181
348/113
(Continued)

FOREIGN PATENT DOCUMENTS

DE 102 42 864 A1 3/2004
DE 10 2006 021 694 A1 11/2007
(Continued)

*Primary Examiner* — Dylan White
(74) *Attorney, Agent, or Firm* — Seed IP Law Group LLP

(57) ABSTRACT

The invention relates to a method for operating a headlight (12) of a motor vehicle (10), which headlight (12) comprises a plurality of light emitting diodes, by receiving a request signal for a high-beam mode; determining a road class of a roadway on which the motor vehicle (10) is located; activating a first group of the plurality of light emitting diodes for providing a first high-beam distribution (20) with the headlight (12) in the event that a road class different from a highway (18) is determined; and activating a second group of the plurality of light emitting diodes for providing a second high-beam distribution (26) with the headlight (12) in the event that a highway (18) is determined as the road class.

19 Claims, 2 Drawing Sheets

(51) Int. Cl.
*H04N 5/232* (2006.01)
*H05B 33/08* (2006.01)

(52) U.S. Cl.
CPC ... *H05B 33/0854* (2013.01); *B60Q 2300/056* (2013.01); *B60Q 2300/112* (2013.01); *B60Q 2300/332* (2013.01); *B60Q 2300/333* (2013.01); *B60Q 2300/334* (2013.01); *B60Q 2300/335* (2013.01); *B60Q 2300/41* (2013.01); *B60Q 2300/42* (2013.01)

(58) Field of Classification Search
USPC .......................................................... 315/82
See application file for complete search history.

(56) References Cited

U.S. PATENT DOCUMENTS

| | | | | |
|---|---|---|---|---|
| 9,227,553 | B2* | 1/2016 | Nordbruch | B60Q 1/085 |
| 9,387,796 | B2* | 7/2016 | Imaeda | B60Q 1/143 |
| 9,415,718 | B2* | 8/2016 | Futamura | B60Q 1/143 |
| 9,527,429 | B2* | 12/2016 | Licsar | B60Q 1/08 |
| 2006/0267502 | A1 | 11/2006 | Kubota et al. | |
| 2009/0141513 | A1* | 6/2009 | Kim | B60Q 1/085 362/507 |
| 2009/0296415 | A1 | 12/2009 | Heinrich et al. | |
| 2012/0275173 | A1 | 11/2012 | Hamm et al. | |
| 2013/0057149 | A1 | 3/2013 | Funk et al. | |
| 2014/0029791 | A1* | 1/2014 | Mori | G06K 9/00791 382/103 |
| 2016/0010998 | A1* | 1/2016 | Chia | G01C 21/26 701/461 |

FOREIGN PATENT DOCUMENTS

| | | | | |
|---|---|---|---|---|
| DE | 102006021694 A1 * | 11/2007 | ............. | B60Q 1/085 |
| DE | 10 2008 032 345 A1 | 1/2010 | | |
| DE | 10 2011 006 073 A1 | 9/2012 | | |
| DE | 10 2011 083 265 A1 | 3/2013 | | |
| DE | 102012001017 A1 * | 7/2013 | ............. | B60Q 1/085 |
| EP | 2 030 838 A2 | 3/2009 | | |
| EP | 2 280 215 A2 | 2/2011 | | |
| EP | 2 338 729 A1 | 6/2011 | | |
| EP | 2 532 552 A2 | 12/2012 | | |
| KR | EP 2532552 A2 * | 12/2012 | ............. | B60Q 1/085 |
| WO | 2012/048795 A1 | 4/2012 | | |

* cited by examiner

METHOD FOR OPERATING A HEADLIGHT FOR A MOTOR VEHICLE

The present invention relates to a method for operating a headlight for a motor vehicle. Moreover, the present invention relates to a headlight for a motor vehicle. Finally, the present invention relates to a motor vehicle.

Until now, there has only been one type of light distribution for lighting the roadway for motor vehicles on public roads. This is implemented asymmetrically; when considering right-hand traffic, this is curtailed by about 1% vertically on the left half and represents a compromise for different classes of roads. The high-beam lights represent an expansion of this light distribution; the high beams provide illumination beyond the range of the low beams. Due to the light distribution when the headlights are in high-beam mode, the high beam may only be activated when there is no other traffic in the glare range of the headlight.

In modern motor vehicles, headlights are installed that comprise a plurality of light emitting diodes which may be activated separately or in groups. In addition, novel adaptive high-beam systems may be provided that overcome the aforementioned disadvantage in that they have certain light emitting diodes per horizontal angle range that only light up said angle range. If other traffic is detected in this range, for example by a camera on the rear view mirror, the light emitting diodes that are associated with this range are switched off. The traffic coming in the opposite direction will no longer be blinded.

Such types of high-beam distributions typically have a very broad light distribution. For example, it may typically extend over an angle range of +/−20° in relation to a main beam direction of the headlight. The result of this is that opposing traffic may be blinded, particularly on highways or structurally separated roadways. In these situations, the headlights of the other traffic may sometimes no longer be detected by the camera because they are behind the middle structure.

In this context, DE 20 2010 006 097 U1 describes a light module for a motor vehicle headlight that comprises multiple separately activatable light emitting diodes for emitting electromagnetic radiation. Furthermore, the light module comprises at least one imaging optics part for depicting the radiation emitted by the light emitting diodes onto a roadway in front of the vehicle. A marker light may be generated with the light module. Furthermore, a different light distribution may be provided, such as a high beam, an urban light, a highway light, or the like, for example.

DE 10 2011 109 440 A1 describes a method for adjusting and/or calibrating at least one headlight of a vehicle. In doing so, a vehicle environment illuminated by means of at least one headlight is encompassed by means of a detection unit. As a function thereof, a horizontal and/or vertical light/dark boundary and a deviation in the light/dark boundary are determined by a specified target value and calibrated or adjusted by means of the determined deviation of the headlight.

Furthermore, DE 10 2011 077 636 A1 describes a light module of a motor vehicle for generating a spotlight distribution of a high-beam distribution. The spotlight distribution is formed by superimposing the spotlight distribution and a base distribution generated by at least one other module. Thus, in addition to the low beams and the high beams, a different type of light distribution—such as, for example, an urban light, a country road light, a highway light, a dynamic curve light or the like may—be provided depending on the situation.

DE 10 2011 006 073 A1 describes a motor vehicle illumination mechanism comprising multiple light modules arranged next to one another. In this case, a partial light distribution is generated with each of the light modules, wherein all of the partial light distributions lie below a straight, horizontal light/dark boundary and the overall light distribution of the illumination mechanisms results via the superimposing of the various partial light distributions.

DE 102 42 864 A1 describes an automatic headlight control device for a motor vehicle. The headlight control device comprises at least one headlight with a light source, evaluation electronics coupled to sensors, and at least one control electronics part adjustable from multiple light distributions of the light source.

The object of the present invention is to provide a method for operating a headlight of a motor vehicle via which the safety on the roadway may be increased. Moreover, a corresponding headlight is to be provided.

The method according to the invention for operating a headlight of a motor vehicle, said headlight comprising a plurality of light emitting diodes, includes the receipt of a request signal for a high-beam mode; the determining of a road class of a roadway on which the motor vehicle is located; the activation of a first group of the plurality of light emitting diodes for providing a first high-beam distribution with the headlight in the event that a road class different from a highway is determined; and the activation of a second group of the plurality of light emitting diodes for providing a second high-beam distribution with the headlight in the event that a highway is determined as the road class.

Given the method, a request signal to provide a high-beam light is received. Such a type of request signal may, for example, be generated via operator input by a driver who actuates a lever in the motor vehicle. As an alternative to this, the request signal may be generated by an adaptive high-beam system or a driver assistance system. Furthermore, the road class of the roadway on which the motor vehicle is currently located is determined. If the motor vehicle is currently on a roadway that is different from a highway, a first group of light emitting diodes is activated such that these provide a first high-beam distribution. In the event that a highway or a roadway similar to a highway is determined as the road class, a second group of light emitting diodes is activated and a second high-beam distribution is provided with these light emitting diodes. The second high-beam distribution may be a variant or modification of the first high-beam distribution. The second high-beam distribution may also be provided independently of the first high-beam distribution. The second high-beam distribution is preferably designed such that the traffic in the opposite lanes of the highway are less blinded. Thus, the high-beam distribution may be adapted depending on whether the driver is on a highway or not. Therefore, a high-beam distribution may be provided to the driver even when driving on a highway, whereby the visibility conditions are improved.

Preferably, the first and the second group of the plurality of light emitting diodes are activated such that the first and the second high-beam distribution extend along an angle range around a main beam direction of the headlight, wherein the angle range of the second high-beam distribution is smaller in comparison to the angle range of the first high-beam distribution. For this purpose, light emitting diodes that are associated with an edge area of the headlight may not be activated with the second high-beam distribution, for example. Thus, this results in a narrower light distribution given the second high-beam distribution. The result of this is that the traffic in the other lanes of highway are not blinded.

Preferably, the road class of the roadway on which the vehicle is located is determined using the velocity of the motor vehicle. If the motor vehicle exceeds a predetermined minimum velocity for a certain time, it may be assumed from this that the motor vehicle is continuing to move on a highway or roadway similar to a highway. Thus, the road class on which the motor vehicle is currently located may be determined in a simple manner.

In a further embodiment, the road class of the roadway on which the vehicle is located is determined using the data of a navigation system. For example, the position of the motor vehicle may be determined using the data of a satellite-assisted positioning system. These data may be compared with a digital map. Information with respect to the road class may be stored in the digital map. Thus, the road class on which the motor vehicle is currently located may be determined in a reliable manner.

In a further embodiment, in the event that a highway is determined to be the road class, a structural separation is determined between the lanes of the highway, and the second group of the plurality of light emitting diodes that are activated to provide the second high-beam distribution is adapted as a function of the detected structural separation. In doing so, it may be determined whether a structural separation is present between the lanes of highway or not. As an alternative or in addition, it may be determined how this structural separation is formed. In this case, it can especially be determined whether, given the structural separation, it is possible for oncoming traffic to be blinded. For example, the data of a camera or the data of a navigation system may be used for this purpose. The light emitting diodes for the second group may be selected as a function of the detected structural separation. Thus, the second high-beam distribution may be adapted as a function of the structural separation between the lanes.

In a further embodiment, in the event that a highway is determined to be the road class, in which lane of the highway the vehicle is located on is additionally determined, and the second group of the plurality of light emitting diodes that is activated to provide the second high-beam distribution is adapted as a function of the determined lane. The second high-beam distribution can be adapted accordingly depending on in which lane the vehicle is located in a multi-lane highway. For example, the second high-beam distribution may be adjusted such that the remaining vehicles on the other roadways are not blinded. Thus, traffic safety may be increased. Preferably, the lane in which the motor vehicle is located may be determined by means of lane markings, using a camera. The boundary lines between the individual lanes and the outer boundary lines may be detected with a camera. The data of a navigation system may also be applied to this end. Thus, the position of the motor vehicle may be reliably determined with respect to the individual lanes.

In a further embodiment, the first and/or the second group of the plurality of light emitting diodes may be activated such that the light emitting diodes that are associated with an edge area of the headlight provide less illuminance as compared to the light emitting diodes that are associated with a middle area of the headlight. For example, the light emitting diodes that are associated with a respective edge area of the headlight may be operated in dimmed mode. This may occur both with the first high-beam distribution and with the second high-beam distribution. Thus, it may be achieved that other traffic is not blinded.

The headlight according to the invention for a motor vehicle comprises a plurality of light emitting diodes; a control device for receiving a request signal for a high-beam mode; a detection device for determining a road class of a roadway on which the motor vehicle is located; wherein the control device activates a first group of the plurality of light emitting diodes for providing a first high-beam distribution in the event that a road class different from a highway is determined, and the control device activates a second [group] of the plurality of light emitting diodes for providing a second high-beam distribution in the event that a highway is determined as the road class.

The motor vehicle according to the invention comprises at least one headlight according to the invention. Preferably, the motor vehicle comprises two of the headlights according to the invention.

The advantages and developments described previously in connection with the method according to the invention apply correspondingly to the headlight according to the invention and the motor vehicle according to the invention.

The present invention will now be explained in greater detail by means of the enclosed drawings. The following is shown:

The exemplary embodiments depicted in greater detail in the following represent preferred embodiments of the present invention.

Figure 1:
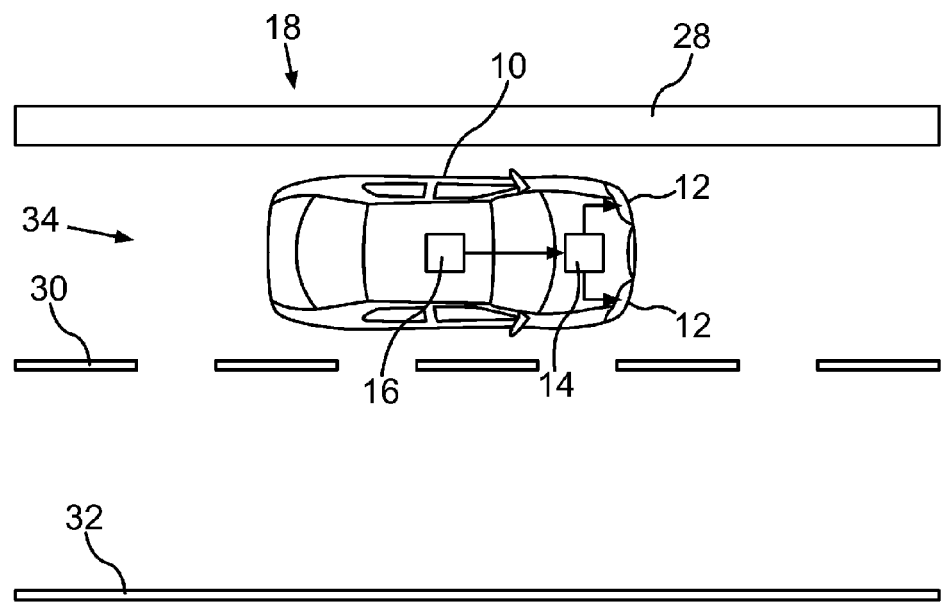
FIG. 1 shows a schematic representation of a motor vehicle that is located on a lane of a highway.

FIG. 1 shows a schematic representation of a motor vehicle 10 in plan view. The motor vehicle 10 comprises two headlights 12. The headlights 12 each comprise a plurality of light emitting diodes. In this case, the individual light emitting diodes may be arranged like a matrix within the headlight 12. This means that the light emitting diodes may be arranged in multiple rows, one above another, within the headlight 12. Furthermore, the motor vehicle 10 comprises a control device 14 which may be used to activate the light emitting diodes of the headlight 12 individually or in groups. With the control device 14, the light emitting diodes may be activated such that a low-beam distribution or a high-beam distribution is provided with the headlights 12.

The control device 14 of the motor vehicle 10 is designed to receive a request signal for a high-beam mode. Such a request signal may be provided by an operator input of a driver, for example. Furthermore, such a request signal may be provided by a driver assistance system. Moreover, the motor vehicle 10 comprises a detection device 16. A road class on which the motor vehicle 10 is currently located may be determined with the detection device 16. For this purpose, the detection device 16 may use the data of a navigation system (not shown here). As an alternative to this, the detection device 16 may receive data from a velocity sensor of the motor vehicle 10. Whether the motor vehicle 10 is on a highway 18 or not may be determined with the detection device 16. In the present exemplary embodiment, the motor vehicle 10 is on a highway 18.

If it is determined with the detection device 16 that the motor vehicle 10 is not on a highway 18, the individual light emitting diodes of the headlights 12 may be activated such that a first high-beam distribution 20 is provided with them. Such a first high-beam distribution 20 is shown in FIG. 2.

Figure 2:
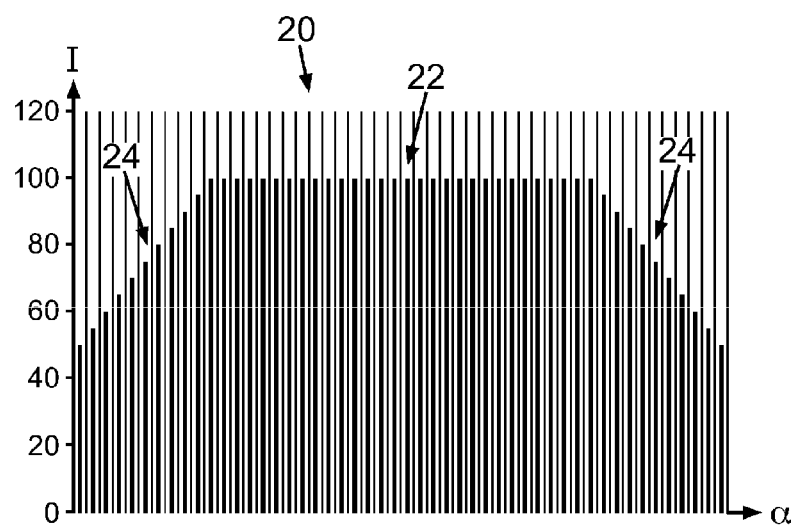
FIG. 2 shows dimming values of light emitting diodes of a headlight of the motor vehicle as a function of an angle range for a first high-beam distribution.

The diagram in FIG. 2 shows an angle range a on the abscissa and respective dimming values I of the light emitting diodes or groups of light emitting diodes of the headlight 12 on the ordinate. A dimming value I of 100 corresponds to the maximum illuminance of the light emitting diodes. Given the present first high-beam distribution 20, the light emitting diodes in a middle region 22 are operated such that they provide the maximum illuminance. This middle region 22 is associated with the region of the main beam direction of the headlight 12. The light emitting diodes that are associated with the two edge areas 24 of the headlight 12 are activated such that they provide less illuminance as compared to the light emitting diodes that are in the middle region 22 of the headlight 12. For this purpose, the light emitting diodes may be operated in dimmed mode, for example using pulse-width modulation.

Figure 3:
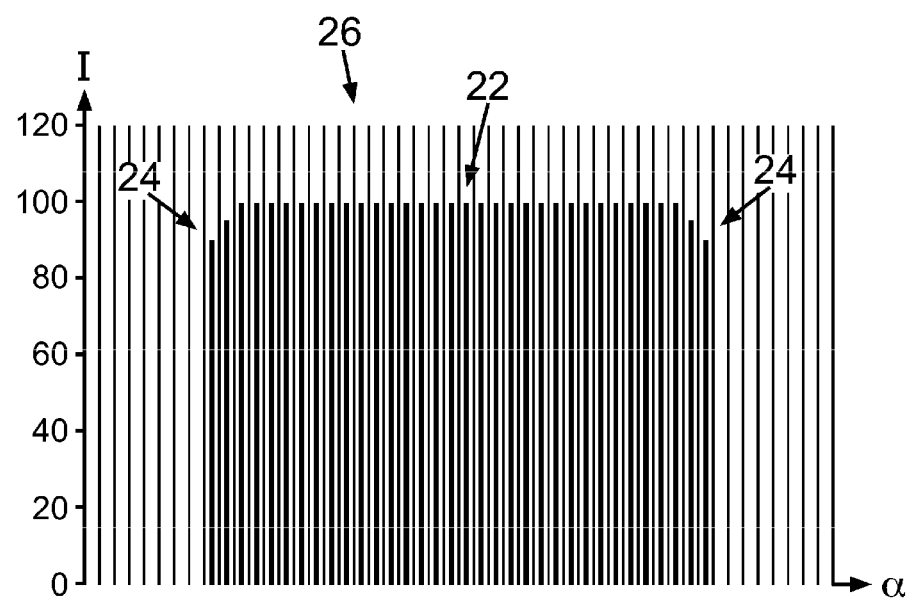
FIG. 3 shows the dimming values of the light emitting diodes of a headlight of the motor vehicle as a function of the angle range for a second high-beam distribution.

FIG. 3 shows a second high-beam distribution 26. Such a type of high-beam distribution 26 is provided by the light emitting diodes of the headlamps 12 when it is determined with the detection device 16 that the motor vehicle 10 is on a highway 18. Given the present second high-beam distribution 26, the light emitting diodes will continue to be operated in a middle area 22 with the maximum illuminance. The light emitting diodes in the edge areas 24 are deactivated area-by-area as compared to the first high-beam distribution 20. Thus, a narrower light distribution is provided with the second high-beam distribution 26 as compared to the first high-beam distribution 20.

The result of this is that the traffic in the oncoming lanes of the highway 18 are not blinded. The driver is also given the possibility of activating the high beams on the highway 18 in order to ensure that the driver has improved visibility conditions.

The detection device 16 is furthermore designed to detect a structural separation 28 that separates the lanes of the highway 18 from one another. For this purpose, the detection device 16 may comprise a corresponding camera. The type of structural separation 28 may be determined with this camera. Thus, for example, it may be determined whether there is a risk of traffic in the oncoming lanes being blinded. The second high-beam distribution 26 may be adapted as a function of the detected structural separation 28. For example, additional light emitting diodes in the edge areas 24 may be dimmed or deactivated. As an alternative to this, additional light emitting diodes may be activated or operated at a higher illuminance.

Furthermore, the detection device 16 is designed to determine in which lane 34 of the highway 18 the motor vehicle 10 is currently located. For this purpose, the detection device 16 may comprise a camera that may be used to detect the lane markings 30, 32. In the present exemplary embodiment, the motor vehicle is in the left lane 34 of the highway 18. The second high-beam distribution 26 may be adapted accordingly as a function of the detected lane 34. Thus, it may be prevented that other traffic is blinded.

The invention claimed is:

1. A method for operating a headlight for a motor vehicle, said headlight comprising a plurality of light emitting diodes, the method, comprising:
   receiving a request signal for a high-beam mode;
   determining a road class of a roadway on which the motor vehicle is located;
   activating a first group of the plurality of light emitting diodes for providing a first high-beam distribution with the headlight in the event that the road class is different from a highway; and
   determining a structural separation between lanes of a highway and activating a second group of the plurality of light emitting diodes for providing a second high-beam distribution with the headlight by activating the second group of the plurality of light emitting diodes in response to determining the structural separation in the event that the highway is determined as the road class.

2. The method according to claim 1, wherein activating the first and the second group of the plurality of light emitting diodes such that the first and the second high-beam distribution extend along an angle range around a main beam direction of the headlight, wherein the angle range of the second high-beam distribution is smaller in comparison to the angle range of the first high-beam distribution.

3. The method according to either claim 1, wherein determining the road class of the roadway on which the motor vehicle is located includes using the velocity of the motor vehicle.

4. The method according to claim 1, wherein determining the road class of the roadway on which the motor vehicle is located includes using the data of a navigation system.

5. The method according to claim 1, wherein determining a lane of the highway in which the motor vehicle is located in response the highway being the road class, and providing the second high-beam distribution by activating the second group of the plurality of light emitting diodes in response to the determining of the lane.

6. The method according to claim 5, wherein determining the lane in which the motor vehicle is located by means of road markings, using a camera.

7. The method according to claim 1, wherein activating the first or the second group of the plurality of light emitting diodes such that the light emitting diodes that are associated with an edge area of the headlight provide less illuminance as compared to the light emitting diodes that are associated with a middle area of the headlight.

8. A headlight for a motor vehicle, comprising:
   a plurality of light emitting diodes;
   a control device to receive a request signal for a high-beam mode;
   a detection device to determine a road class of a roadway on which the motor vehicle is located,
   the control device configured to activate a first group of the plurality of light emitting diodes to provide a first high-beam distribution in the event that the determined road class is different from a highway; and
   the control device configured to determine a lane of a highway in which the motor vehicle is located and activate a second group of the plurality of light emitting diodes to provide a second high-beam distribution by activating the second group of the plurality of light emitting diodes in response to a determination of the lane in the event that the highway is determined to be the road class.

9. The headlight according to claim 8 wherein the control device is configured to determine the lane in which the motor vehicle is located by means of road markings, using a camera.

10. A motor vehicle, comprising:
    a body of the motor vehicle, and
    at least one headlight on the body, the headlight including:
    a plurality of light emitting diodes;

a control device which in operation receives a request signal for a high-beam mode;
a detection device which in operation determines a road class of a roadway and outputs determination information;
in response to the determination information corresponding to a non-highway road class, the control device in operation activates a first group of the plurality of light emitting diodes to provide a first high-beam distribution; and
in response to the determination information corresponding to a highway road class, the control device in operation determines a lane of the highway in which the motor vehicle is located and activates a second group of the plurality of light emitting diodes to provide a second high-beam distribution by activating the second group of the plurality of light emitting diodes in response to the determination of the lane.

11. The motor vehicle of claim 10 wherein the control device is configured to determine a structural separation between lanes of the highway in response to the determination information corresponding to a highway road class, and wherein the control device is configured to activate the second group of the plurality of light emitting diodes to provide the second high-beam distribution by activating the second group of the plurality of light emitting diodes in response to a determination of the structural separation.

12. An automobile, comprising:
a headlight including a plurality of light emitting diodes;
a detection device which in operation determines a road class of a roadway and outputs determination information; and
a control device which in operation receives a signal corresponding to a request for a high-beam mode of the headlight,
in response to the signal corresponding to the request for a high-beam mode of the headlight and the determination information corresponding to a non-highway road class, the control device in operation activates first subsets of the plurality of light emitting diodes in a non-highway configuration, the first subsets include a first middle region of the plurality of light emitting diodes at a first illuminance, a first edge region of the plurality of light emitting diodes at a second illuminance that is less than the first illuminance, and a second edge region of the plurality of light emitting diodes at a third illuminance that is less than the first illuminance;
in response to the signal corresponding to the request for a high-beam mode of the headlight and the determination information corresponding to a highway road class, the control device in operation activates second subsets of the plurality of light emitting diodes in a highway configuration, the second subsets include a second middle region of the plurality of light emitting diodes at a fourth illuminance, a third edge region of the plurality of light emitting diodes at a fifth illuminance that is less than the fourth illuminance, a fourth edge region of the plurality of light emitting diodes at a sixth illuminance that is less than the fourth illuminance, a first intermediate region of the plurality of light emitting diodes between the fourth and fifth illuminances, and a second intermediate region of the plurality of light emitting diodes between the fourth and sixth illuminances.

13. The automobile of claim 12 wherein activating the first and second edge regions of the plurality of light emitting diodes includes activating each of the first and second edge regions of the plurality of light emitting diodes to have illuminances that vary linearly with distance from a center of the plurality of light emitting diodes.

14. The automobile of claim 13 wherein activating the first and second intermediate regions of the plurality of light emitting diodes includes activating each of the first and second intermediate regions of the plurality of light emitting diodes to have illuminances that vary linearly with distance from a center of the plurality of light emitting diodes.

15. The automobile of claim 14 wherein activating the first and second intermediate regions of the plurality of light emitting diodes includes activating each of the first and second intermediate regions of the plurality of light emitting diodes to have illuminances that vary from the fourth illuminance adjacent to the second middle region of the plurality of light emitting diodes and decrease linearly with distance from the center of the plurality of light emitting diodes to intermediate illuminances less than the fourth illuminance and greater than the fifth illuminance adjacent to the third edge region of the plurality of light emitting diodes and less than the fourth illuminance and greater than the sixth illuminance adjacent to the fourth edge region of the plurality of light emitting diodes, respectively.

16. The automobile of claim 12 wherein operating light emitting diodes at less than their maximum illuminance includes using pulse width modulation to dim the light emitting diodes.

17. The automobile of claim 12 wherein the detection device is configured to detect, in response to the determination information corresponding to a highway road class, a structural separation between lanes of the highway, and the control device is configured to activate the light emitting diodes based on the detection of the structural separation.

18. The automobile of claim 12 wherein the detection device is configured to determine, in response to the determination information corresponding to a highway road class, an identity of a lane of the highway the automobile is located within, and the control device is configured to activate the light emitting diodes based on the identity of the lane.

19. The automobile of claim 18 wherein the detection device is configured to determine the identity of the lane using a camera to identify road markings.

* * * * *